United States Patent [19]

Omiya et al.

[11] 4,427,353
[45] Jan. 24, 1984

[54] UPRIGHT INJECTION-COMPRESSION PRESSING MACHINE FOR THE MANUFACTURE OF INFORMATION CARRIER DISCS

[75] Inventors: Shoji Omiya, Shijonawate; Masaaki Sunohara; Tokihalu Nakagawa, both of Hirakata; Seiji Inagaki, Nara; Junnosuke Yamawaki, Sakurai; Nobuyuki Nakamura; Kaoru Yanagisawa, both of Nagano, all of Japan

[73] Assignees: Matsushita Electric Industrial Co., Ltd.; Teichiku Co., Ltd., both of Osaka; Nissei Plastic Industrial Co., Ltd., Nagano, all of Japan

[21] Appl. No.: 333,621

[22] Filed: Dec. 22, 1981

[30] Foreign Application Priority Data

Dec. 26, 1980 [JP] Japan ................................. 55-187765

[51] Int. Cl.³ .............................................. B29F 1/03
[52] U.S. Cl. ..................................... 425/151; 425/568; 425/569; 425/810; 264/328.7
[58] Field of Search ............... 425/810, 590, 151, 568, 425/569; 264/328.7

[56] References Cited

U.S. PATENT DOCUMENTS 2,657,429 11/1953 Faust ............................... 425/590 X
3,196,485 7/1965 Battenfeld ......................... 425/810 X Primary Examiner—Thomas P. Pavelko
Attorney, Agent, or Firm—Wenderoth, Lind & Ponack

[57] ABSTRACT

An upright injection-compression pressing machine for the manufacture of information carrier discs, such as photograph records and video discs, has a mold clamper assembly including a pair of stamper bearing molds movable relative to each other in a vertical direction towards and away from each other, and an injector assembly mounted on the clamper assembly in alignment with the direction of the relative movement of the molds.

7 Claims, 11 Drawing Figures

UPRIGHT INJECTION-COMPRESSION PRESSING MACHINE FOR THE MANUFACTURE OF INFORMATION CARRIER DISCS

The present invention generally relates to a plastic molding machine for the manufacture of information carrier discs and, more particularly, to a vertical or upright injection-compression pressing machine suited particularly for the manufacture of information carrier discs, such as video discs and phonograph records, of a type which require high quality and precise dimensional requirements to be satisfied.

Conventional phonograph records are currently generally manufactured by two alternative methods. One of these methods is a compression molding method wherein a hydraulic record press including a pair of stampers are utilized, which stampers are clamped together with a plastic biscuit or any other record material compressed therebetween. The other method is an injection molding method wherein an injection molding machine is employed, which injection molding machine is so designed as to inject a predetermined amount of semi-fluidized record material into a clearance of a few millimeters between a pair of stamper bearing molds and then to cause the molds to clamp together to compress the record material. Of these methods, the use of the injection molding machine is considered advantageous in the manufacture of video discs, which are generally required to satisfy both high quality standards and precise dimensional requirements, for the following reasons:

(a) In the method wherein the injection molding machine is employed, since it is possible to inject the record material at an elevated temperature substantially instantaneously, the molding of an information carrier disc can readily be performed while it is fluidized, with no substantial loss of the record material and without impairing the surface of one or both of the stampers. This is particularly true where a relatively large amount of carbon tending to cause retarded flow of the record material as a whole is mixed with the record material to make an information carrier disc having an electroconductive property.

(b) The compression molding method requires the preforming of the record material to be done before it is placed in between the stampers. During the preforming, not only does the surface of the record material tend to be hardened, but also a stabilizing agent added to the record material tends to smear therefrom with foreign matter attached thereto. These defects cause impairment of the surface of one or both of the stampers, resulting in the subsequent production of information carrier discs of reduced quality. However, the injection molding method is free from these defects.

(c) Since the injection molding method is such that the molds having the respective stampers are tightly clamped together, there is substantially no room for foreign matter to intrude between the molds. Even though some foreign matter is trapped between the molds, it can readily be removed by the flow of air induced during the closure of the molds and/or during the injection of the record material.

Thus, the injection molding method is advantageous in that any possible occurrence of the surface defects in the information carrier discs manufactured one after another in succession can be reduced.

However, since the prior art injection molding machine is constituted by a combination of a horizontally positioned injector assembly and a vertical or upright mold clamper assembly, the use of the prior art injection molding machine for the manufacture of information carrier discs, particularly video discs requiring high quality standards to be satisfied, involves the following disadvantages and inconveniences:

(a) Since the molds are supported in an upright position, the record material injected tends to be biased downwards by its own weight to such an extent as to result in difficulty in making the information carrier disc of uniform thickness. The downward bias of the record material injected renders it difficult to adjust the clearance between the molds, the timing with which the molds are to be clamped together, the heating and cooling cycle and other molding conditions.

(b) Since movable parts of one or both of the injector assembly and the mold clamper assembly constitute a weight acting horizontally on a guide unit and/or tie bars, component parts of individual mechanisms must be of a large size sufficient to support such weight and, therefore, the machine itself is consequently large in size and requires a relatively large space for installation. While it is generally considered desirable to make the machine about 75 cm above the floor in order to facilitate the attachment and removal of the molds and the handling of the formed information carrier discs, the floor space below the injector and clamper assemblies necessarily becomes large and, therefore, the machine itself is very bulky. In particular, where a centralized hydraulic pressure generator system is used to feed a plurality of molding machines, the floor space referred to above is wasted floor space. Since the molding of the video disc cannot be successfully performed when there is dust floating in the surroundings, the molding machine is usually installed in a dust free room and, therefore, the bulkiness of the machine itself and the requirement of the relatively large space for installation are problems difficult to overcome.

(c) Laborious and time-consuming procedures are required to remove and attach the molds because of the upright arrangement of the molds. In the case of the manufacture of the video discs, guide pins for the molds have often been used to perform the centering in order to improve the preciseness of centering of the opposite surfaces of the video disc, rather than relying on the guide preciseness of the tie bars. In this case, it is necessary that one of the molds should be supported for movement in a direction radially of the mold, and the consequence is that the total weight of the molds acts on the guide pins, rendering the injection molding machine impractical.

The present invention has been developed with a view to substantially eliminating the disadvantages and inconveniences inherent in the prior art injection molding machine which arise, as hereinbefore discussed, when the machine is used for the manufacture of information carrier discs of high quality and has for its essential object to provide an improved upright injection-compression pressing machine suited for the production of the high quality information carrier discs, which machine is constituted by a horizontally positioned mold clamper assembly and an upright injector assembly mounted on the clamper assembly through a top fixed plate. Although this type of injection molding machine is available in fields other than the manufacture of the records, it is the present invention that provides, for the first time, an upright injection-compression pressing machine suited for the production of the information carrier discs or records.

In order for the upright injection-compression pressing machine according to the present invention to have a high practical and commercial value, the present invention has the following additional objects.

(i) In the upright injection-compression pressing machine, foreign matter tends to intrude easily through a bore defined in the top surface of the upper fixed plate for the insertion of an injection cylinder and tends to cause impairment of the stampers when they enter through a resin injection port in the mold during the upward movement of the injection cylinder. The present invention has another object to provide an improved machine free from this problem.

(ii) The present invention has a further object to provide an improved machine wherein the removal of the unnecessary plasticized resin remaining inside the injection cylinder can be carried out at a reduced height and wherein the stroke of movement of the cylinder is reduced to a value equal to or smaller than half the stroke of movement of the cylinder in the prior art injection molding machine.

(iii) A still further object of the present invention is to provide an improved machine wherein care is taken to avoid the possibility that an excessive weight is imposed on the nozzle at the tip of the injection cylinder and also at the nozzle receptacle on the side of the mold and which is, therefore, stabilized and substantially less susceptible to damage, thereby enabling it to be manufactured at a reduced cost.

These and other objects and features of the present invention will become apparent from the following description of preferred embodiments thereof taken with reference to the accompanying drawings, in which:

Before the description of the present invention proceeds, it is to be noted that like parts are designated by like reference numerals throughout the accompanying drawings.

Figure 1:
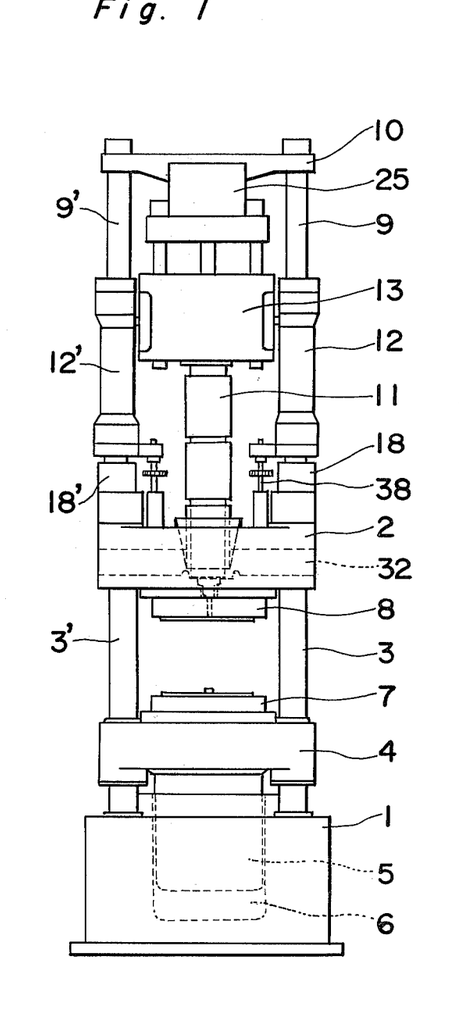
FIG. 1 is a front elevational view of an upright injection-compression pressing machine according to the present invention.
Figure 2:
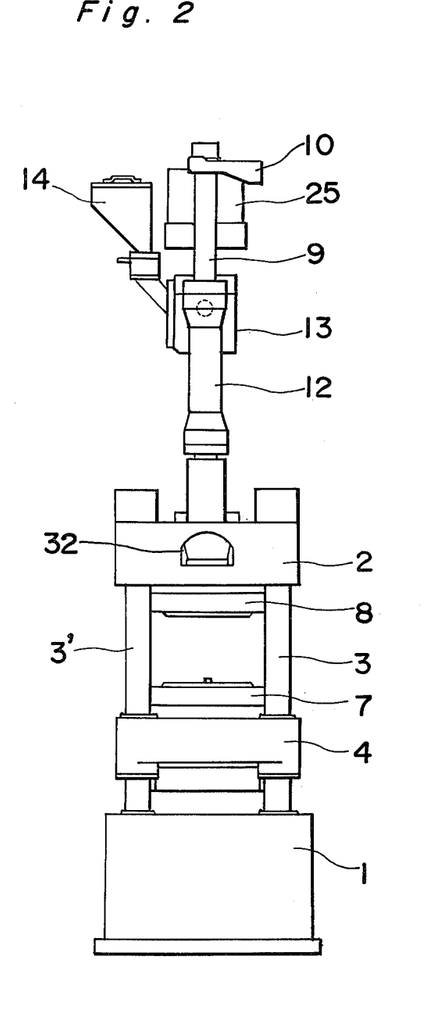
FIG. 2 is a side elevational view of the upright injection-compression pressing machine shown in FIG. 1.

Referring first to FIGS. 1 and 2, reference numerals 1 and 2 designate lower and upper fixed plates, respectively, said lower and upper fixed plates 1 and 2 connected in spaced relation to each other by means of tie bars 3 and 3'. Reference numeral 4 designates a movable plate slidably supported on the tie bars 3 and 3' for movement in a vertical direction between the lower and upper fixed plates 1 and 2 by the action of a mold clamper mechanism incorporated in the lower fixed plate 1 and constituted by a ram 5 and a cylinder 6. Reference numeral 7 designates a lower mold fixedly carried by the movable plate 4 and adapted for the formation of an information carrier disc in cooperation with an upper mold 8 fixedly carried by the upper fixed plate 2. The ram 5 and cylinder 6 constitute a first drive means which concurrently serves as a sliding mechanism for moving the movable plate 4 in a vertical direction along tie bars 3 and 3', between a removal position, in which the molds 7 and 8 are spaced in readiness for the removal of an information carrier disc as shown in FIG. 1, and a clamped position, in which the molds are pressed against each other, past an intermediate position in which the molds are spaced a predetermined distance during the injection of the record material.

Figure 4:
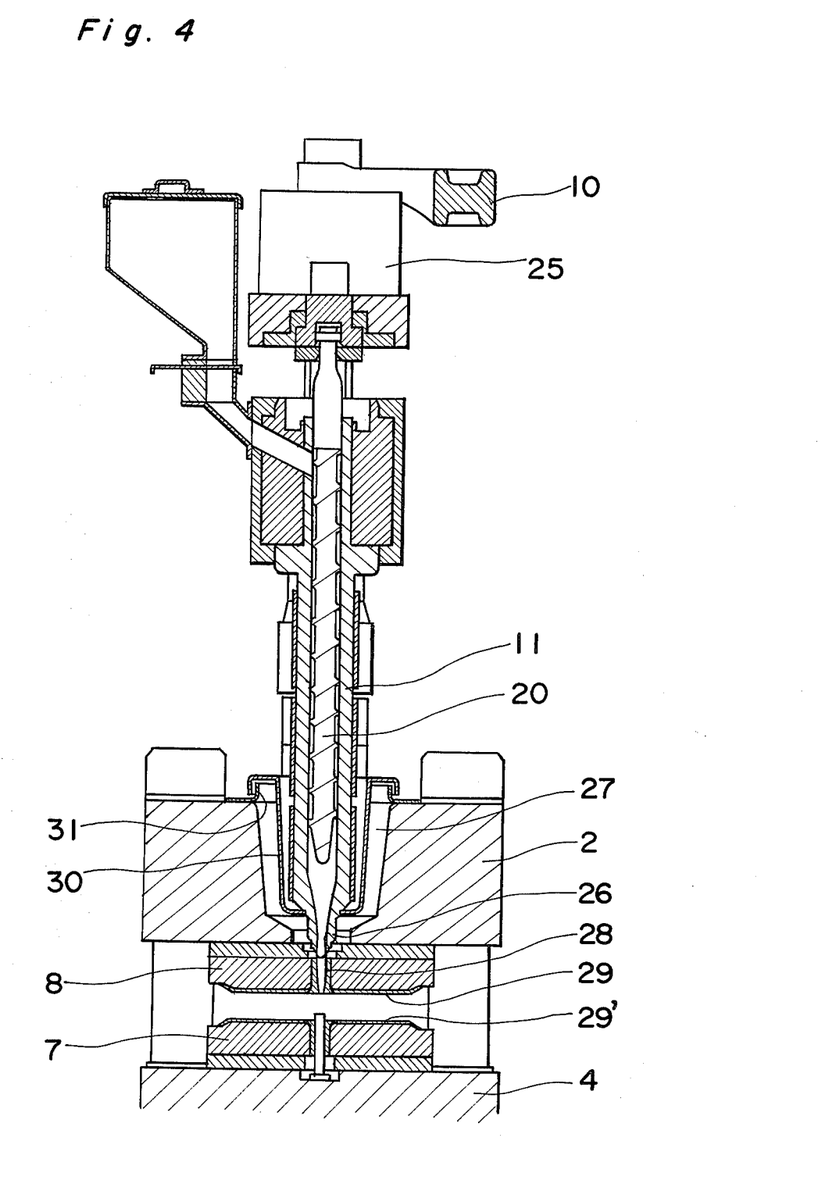
FIG. 4 is a cross sectional view, on an enlarged scale, of an essential portion of the machine shown in FIG. 2.

Means for elevating the lower mold 7 from the removal position to the intermediate position is so constructed that the lower mold 7 can be elevated at a relatively high speed by an ordinarily employed auxiliary cylinder, thereby permitting the molding to be completed in a relatively short period of time. Reference numeral 14 designates a hopper from which a record material is supplied onto an injection cylinder 11 through a holder assembly 13 extending parallel to the injection cylinder 11 as shown in FIG. 4.

Reference numeral 38 designates a biasing force adjusting mechanism, the details of which will be described later with reference to FIGS. 3 and 8. Reference numeral 32 designates a removal manhole defined in the upper fixed plate 2 for the removal of an unnecessary plasticized record material remaining in the injection cylinder, the details of which will be described later with reference to FIGS. 3 and 6.

The second drive means and arrangement peripheral to the injection cylinder 11 will now be described with particular reference to FIG. 3.

Figure 3:
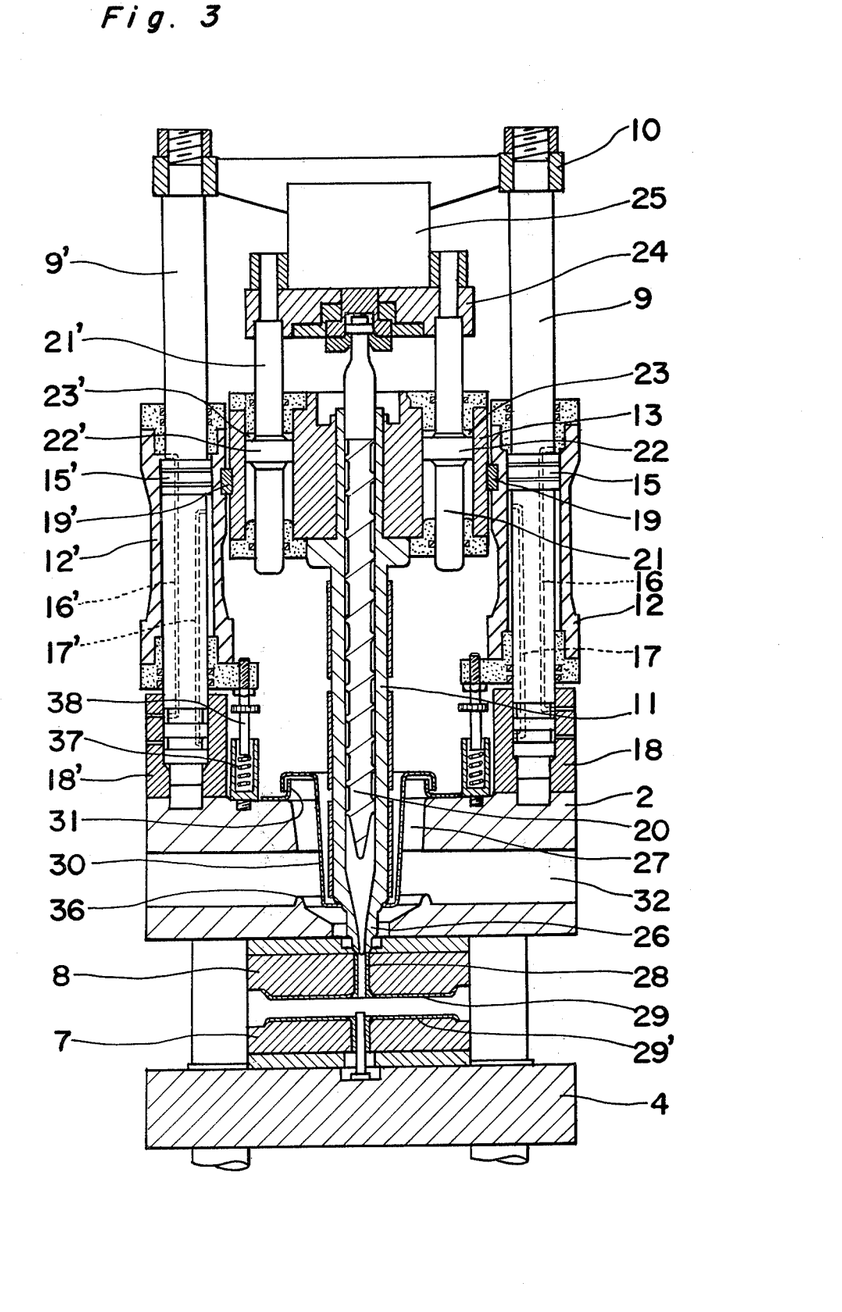
FIG. 3 is a cross sectional view, on an enlarged scale, of an essential portion of the machine shown in FIG. 1.

Referring to FIG. 3, mounted on the guide shafts 9 and 9' are piston members 15 and 15' together with drive cylinders 12 and 12'. The piston members 15 and 15' are rigidly connected to respective guide shafts 9 and 9' and are axially slidably accommodated within the associated drive cylinders 12 and 12'. The guide shafts 9 and 9' each have elevating and elevating fluid passages 16, or 16', and 17, or 17', defined therein in communication with respective working chambers defined between the drive cylinder 12 or 12', closed by the associated piston member 15 or 15', and the guide shaft 9 or 9', said passages 16, or 16', and 17, or 17', being in turn communicated through a corresponding support block 18 or 18' which is provided on the upper fixed plate 2 for the support of the guide shaft. The holder assembly 13 is controlled by a second drive means, which is constituted by upper portions of the drive cylinders 12 and 12' and a hydraulic control circuit. The guide shafts 9 and 9' extending in parallel relation to each other are mounted on lateral portions of the upper fixed plate 2 and extend vertically, the upper ends of the respective guide shafts 9 and 9' opposite to the upper fixed plate 2 being connected together by means of a support member 10 whereby said guide shafts 9 and 9' guide the injection cylinder 11 to enable the latter to move vertically.

Figure 6:
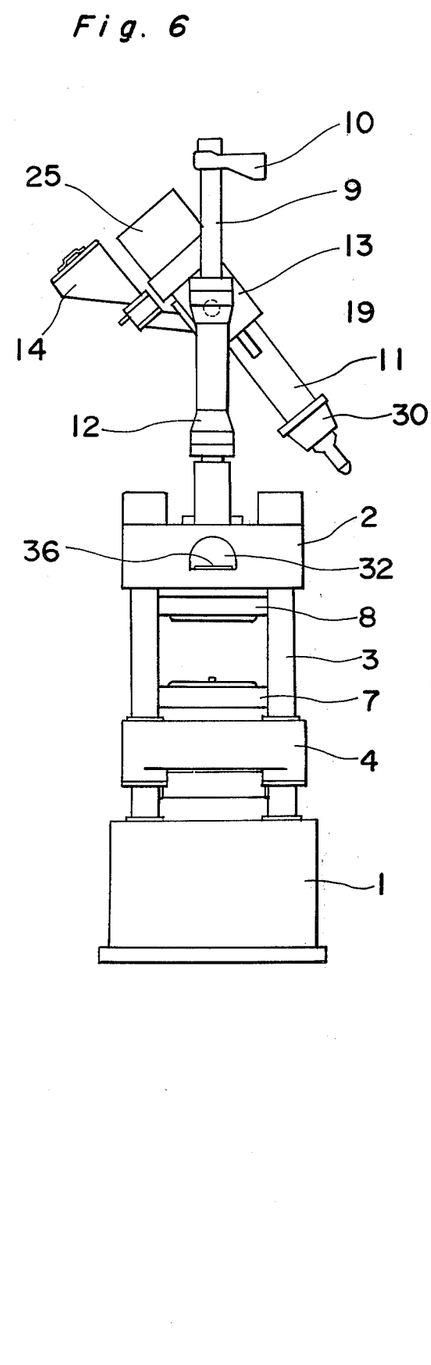
FIG. 6 is a view similar to FIG. 2, showing the machine in a different operative position.

The guide shafts 9 and 9' have the hydraulically operated drive cylinders 12 and 12' mounted slidably thereon, to which drive cylinders 12 and 12' the holder assembly 13 for the carriage of the injection cylinder 11 is rigidly secured. The drive cylinders 12 and 12' are rotatably mounted on the holder assembly 13 in bearings 19 and 19' so that, as shown in FIG. 6, both the holder assembly 13 and the injection cylinder 11 extending in parallel to said holder assembly 13 can rotate about the bearings 19 and 19' for facilitating the removal of a screw 20 extending inside the cylinder 11 in parallel relation thereto and/or the cleaning and maintenance of the injection cylinder 11. Normally, the drive cylinders 12 and 12' and the holder assembly 13 are fixed by a lock mechanism (not shown) in position with the injection cylinder 11 extending in a vertical direction perpendicular to the upper fixed plate 2.

Thus, the second drive means, while the cylinders 12 and 12' and the guide shafts 9 and 9' support the holder assembly 13 and the injection cylinder 11 in balanced condition, concurrently serves as the sliding mechanism for upwardly and downwardly moving the holder assembly 13, and the mechanism can thus be simplified and have a reduced weight and, therefore, the height can be reduced. In addition, since the holder assembly 13 serves as a connecting member for connecting the drive cylinders 12 and 12' together and the holder assembly 13 is connected thereto through the bearings 19, thereby serving as a mechanism for rotating the injection cylinder 11, the mechanism is further simplified and has a reduced weight.

Referring still to FIG. 3, the holder assembly 13 is provided with piston areas 22 and 22', rigidly mounted on corresponding piston rods 21 and 21', and hydraulic cylinders 23 and 23', upper ends of said piston rods 21 and 21' being connected to a support plate 24 which carries a screw drive means 25 thereon, said screw drive means 25 being operatively coupled to the feed screw 20 extending through the support plate 24, the piston rods 21 and 21' and cylinders 23 and 23' constituting a third drive means. The injection cylinder 11 has its upper and extending vertically and coaxially through the holder assembly 13 and has the lower end formed into an injection nozzle 26. This nozzle 26 extends through an aperture 27 defined a central region of the upper fixed plate 2 and is urged under a predetermined pressure against a nozzle socket 28 defined centrally in the upper mold 8.

The nozzle socket 28 also serves to align and support the stamper at a central area in contact with the upper mold 8, the stamper 29 being a positive disc in which signal or video information to be reproduced on the information carrier disc is recorded. Reference numeral 29' represents another stamper mounted on the lower mold 7. The details of the method of mounting the stamper 29 on the upper mold 8 in tight contact with the nozzle socket 28 will not be herein described.

Figure 5A:
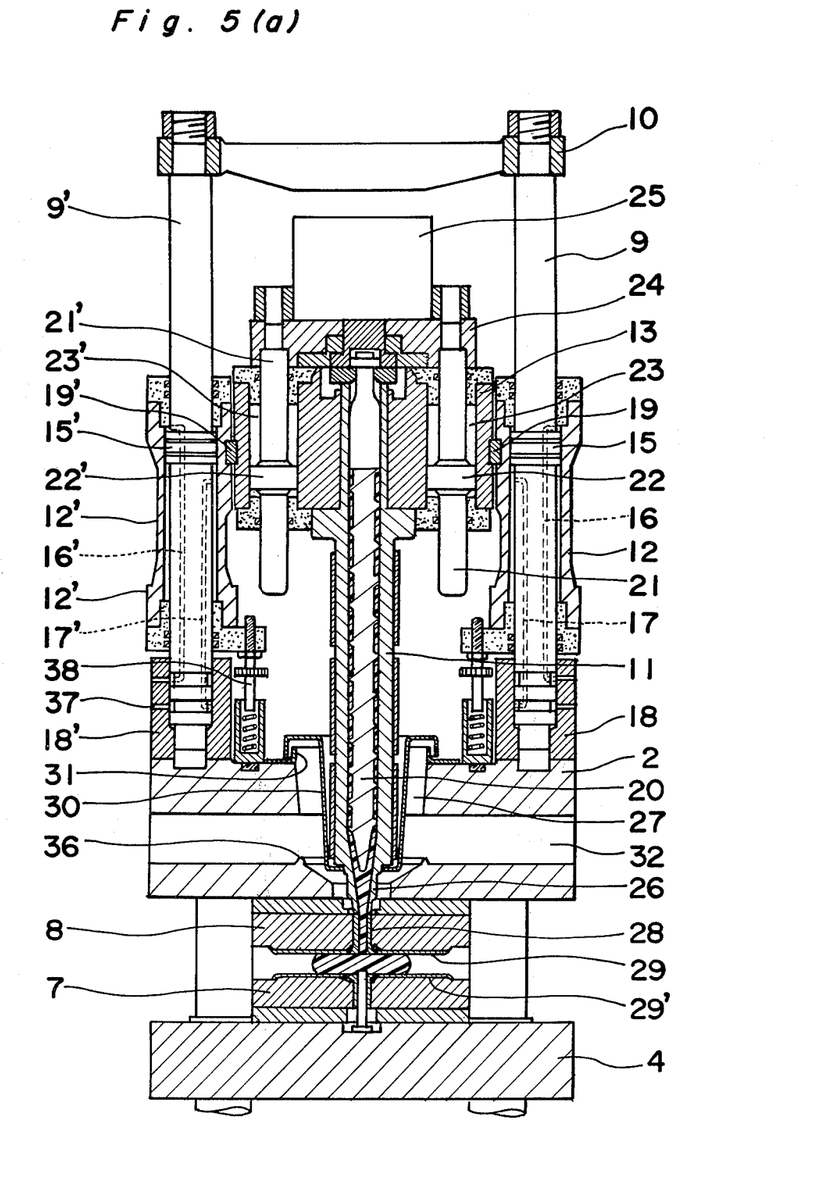
FIG. 5(a) is a view similar to FIG. 3, showing a plasticized record material being injected between a pair of stamper bearing molds.
Figure 5B:
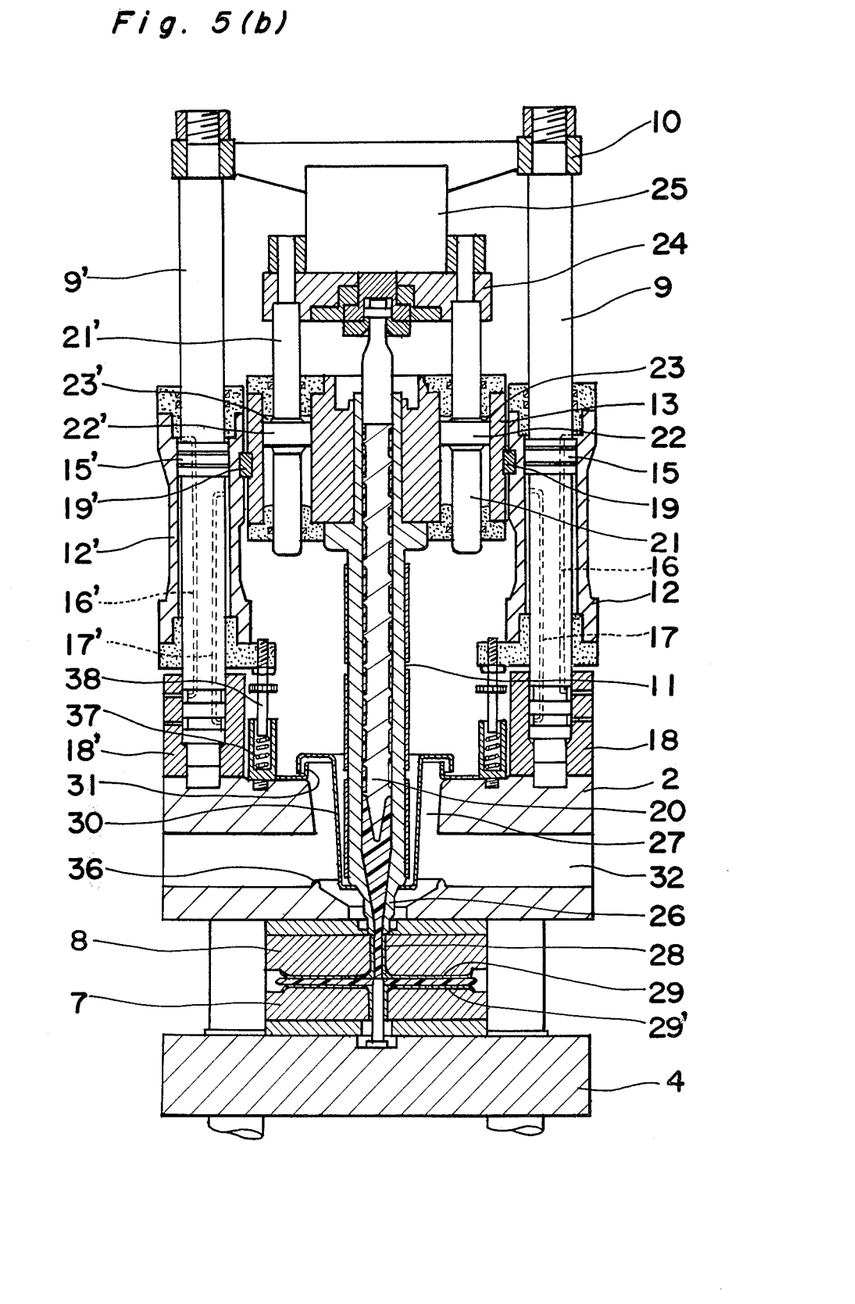
FIG. 5(b) is a view similar to FIG. 3, showing the stamper bearing molds being clamped together.

Since the third drive means is so constructed that both of the piston rods 21 and 21' and the cylinders 23 and 23' extend in spaced and parallel relation to each other and also to the feed screw 20 and either of the drive cylinders 12 and 12' can function as the second drive means, the overall height of the machine can be reduced and, accordingly, the machine itself can be manufactured in a compact size. In FIG. 3, the feed screw 20 is shown as held in a position ready to inject the record material in between the molds 7 and 8, whereas the feed screw 20 shown in FIG. 5 is held in a position wherein the record material is being injected in between the molds 7 and 8 from the top of the screw 20 with the piston rods 21 and 21' being downwardly shifted. Each of the molds 7 and 8 have a construction adapted to be either cyclically heated and cooled by steam and water as is the case in the conventional compression molding machine or adapted to be heated to a predetermined temperature as is the case in the conventional injection molding machine.

Figure 7A:
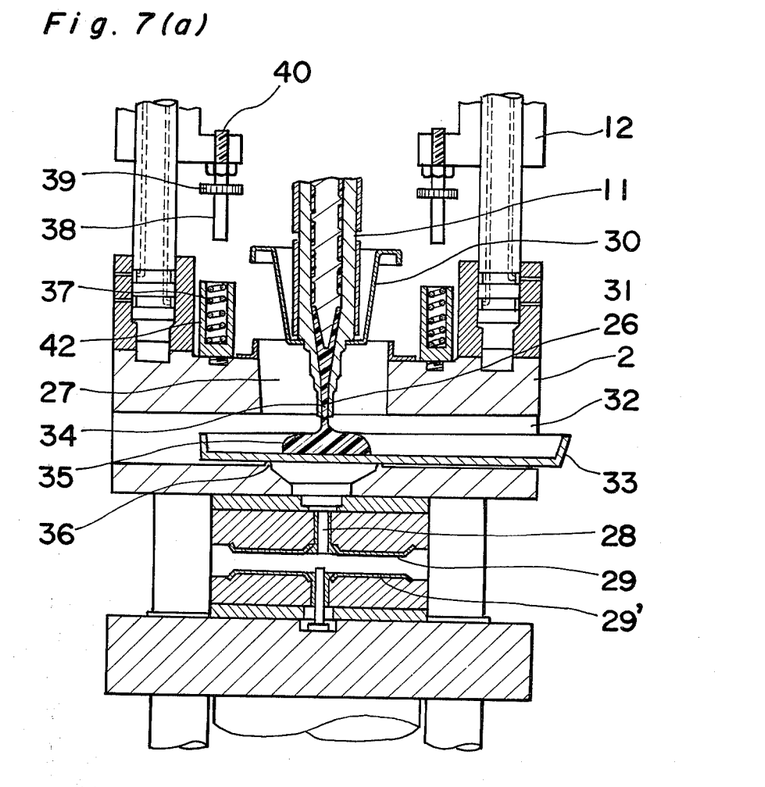
FIG. 7(a) is a side sectional view of a portion of the machine adjacent the tip of an injection cylinder and its peripheral component parts, showing the removal of an unnecessary plasticized record material remaining in the injection cylinder.
Figure 7B:
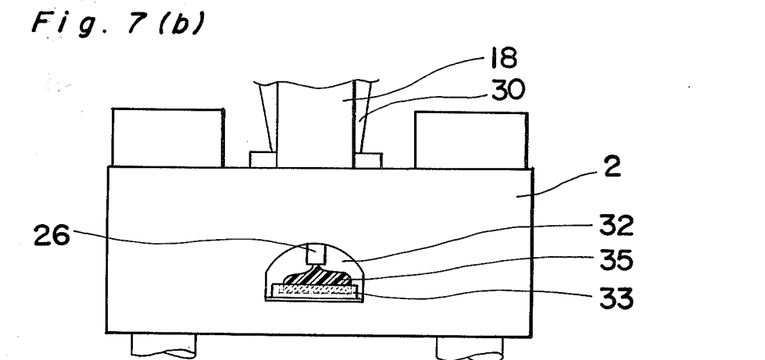
FIG. 7(b) is a side elevational view, viewed in a different angle, of what is shown in FIG. 7(a)
Figure 9:
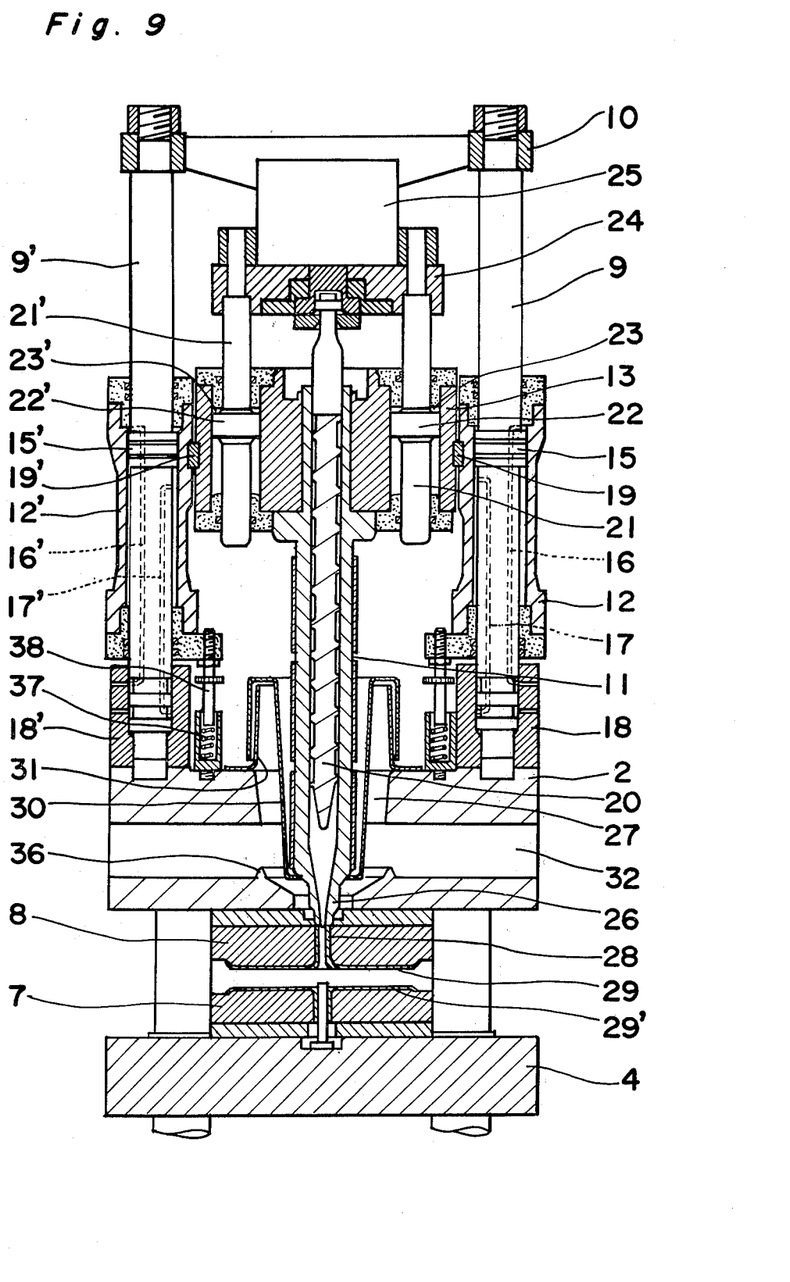
FIG. 9 is a view similar to FIG. 3, showing a different embodiment of the present invention.

Reference numeral 30 designates a shielding sleeve having the lower end secured to the lower end of the injection cylinder 11 and the upper end turned downwards so as to enclose an upright flange portion of a shielding sleeve 31 rigidly mounted on the upper fixed plate 2. It is to be noted that the lower end of the shielding sleeve 30 is secured to the lower end of the injection cylinder 11 so as to avoid any possible intrusion of foreign matter towards the tip of the injection cylinder 11 adjacent the nozzle. It is also to be noted that, as shown in FIG. 9, either the downwardly turned upper end of the shielding sleeve 30 or the upright flange portion of the shielding sleeve 31 may be so lengthened that they can be kept in overlapping relation to each other even when the injection cylinder 11 has been upwardly shifted. The arrangement of the shielding sleeves 30 and 31 as shown in FIG. 9 is advantageous in that the removal of the unnecessary plasticized record material remaining inside the injection cylinder 11 can readily be carried out by the use of a removal tray 33 as will be described later with reference to FIG. 7.

The manhole 32 is formed in the upper fixed plate 2 at a position intermediately of the thickness thereof so as to horizontally extend at right angles to an opening 27 defined therein for the passage of the lower portion of the injection cylinder 11 therethrough during the upward and downward movement of the injection cylinder 11, said manhole 32 having a semicircular cross-sectional shape as shown in FIG. 7. The manhole 32 has a flat bottom wall with an annular projection 36 in alignment with the opening 27 in the upper fixed plate 2, said annular projection 36 serving to prevent foreign matter entering the manhole 32 from falling downwards through the opening 27. FIG. 7 illustrates the condition in which, when the injection cylinder 11 is upwardly shifted, the removal tray 33 is inserted into the manhole 32 for the receipt of the unnecessary plasticized record material 35 which is, subsequent to the insertion of the tray 33 into the manhole 32, injected onto the removal tray 33. In this condition, since the tray 33 rests on the annular projection 36 formed on the plain bottom wall, any foreign matter falling through the opening 27 can not fall further downwards towards the bottom of the opening 27 and then towards the clearance between the stampers 29 and 29' through an aperture in the nozzle socket 28. In this way, any possible impairment of one or both of the stampers 29 and 29' which would otherwise result from the contact of the foreign matter therewith can advantageously be avoided by the provision of the shielding sleeves 30 and 31 and the removal manhole 32.

The stroke of the cylinder 11 is such that, when the cylinder 11 is upwardly shifted, the nozzle of the cylinder 11 reaches a height level with the manhole 32. Therefore, not only can any possibility of the intrusion of foreign matter be avoided, but also the energy saving and the prolonged life of the mechanically sliding component parts can be attained. Moreover, the removal of the unnecessary plasticized record material can be carried in a short period of time and, therefore, not only can any possible deterioration of the record material inside the nozzle be avoided, but also the re-start of the press can be facilitated. Although in general the upright injection-compression pressing machine tends to result in the positioning of the upper fixed plate 2 at a position higher than the eye level of the attendant worker, this possibility can be eliminated by providing the manhole 32 at a position sufficient to permit the attendant worker to conveniently perform the removal of the unnecessary record material resulting in improved workability and safety.

Figure 8:
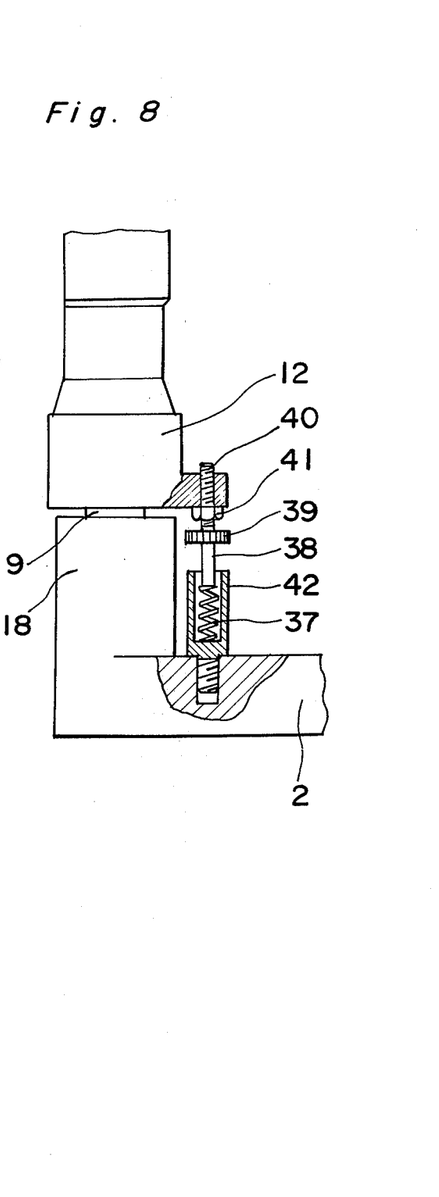
FIG. 8 is a fragmental side view, on an enlarged scale, of what is shown in FIG. 7(a)

Referring now to FIGS. 3, 5, 7 and 8, the details of the biasing force adjusting mechanism identified by 38 will be described. FIG. 8 illustrates the condition of the biasing force adjusting mechanism 38 when the nozzle 26 shown in FIGS. 3 and 5 is fitted under pressure into the nozzle socket 28. This adjusting mechanism 38 comprises a compression spring 37 accommodated in a holder 42 rigidly mounted on the upper surface of the upper fixed plate 2. A spindle 40 has a threaded upper end threadingly engaged in a projection on the drive cylinder 12 and a lower end inserted in the holder 42 and held in contact with the compression spring 37, a substantially intermediate portion of said spindle 40 having a manipulatable ring 39 integrally formed therewith. Reference numeral 40 designates a lock nut for avoiding the loosening of the spindle 40. When the nozzle 26 is fitted under pressure into the nozzle socket 28 as described with reference to FIG. 3, this pressure corresponds to the total weight of the cylinder 11, the holder assembly 13, the screw drive means 25, the drive cylinders 12 and 12' and their associated parts and amounts to about 500 to 1,000 kg. Specifically, this pressure is increased when the drive cylinders 12 and 12' exert the descending force and, therefore, it it may impose an undesirable force on the nozzle socket 28 in terms of its physical strength. Since the nozzle socket 28 serves to tightly contact the stamper 29 with the associated mold, the stamper 29 will undesirably be forced to separate from the mold when the excessive force acts on the nozzle socket which may cause a possible deformation of the mold 8. In view of the above about 200 kg is generally considered sufficient for the contact pressure between the nozzle 26 and the nozzle socket 28 in the case of an ordinary injection molding machine. In the present invention, the provision of the biasing force adjusting mechanism 38 permits the contact pressure between the nozzle 26 and the nozzle socket 28 to be adjusted to about 200 kg. Specifically, this is achieved by turning the manipulatable ring 39 to adjust the contact pressure between the spindle 40 and the compression spring 37. It is to be noted that since the contact pressure of the nozzle varies with the molding condition and/or the type of the record material it should, therefore, be adjusted by turning the manipulatable ring 39 on the spindle 40.

The upright injection-compression pressing machine of the construction hereinbefore described operates in the following manner to make an information carrier disc.

Assuming that the mold 7 has been upwardly shifted by the upward movement of the ram 5 or by the high speed elevating auxiliary cylinder (not shown) from the removal position in which the shaped disc can be removed to the injection position as shown in FIG. 3, the supply of a hydraulic medium from the hydraulic pressure generator system (not shown) to the cylinders 23 and 23' shown in FIG. 3 is initiated to cause the piston rods 21 and 21' to descend together with the feed screw 20. As the feed screw 20 descends incident to the downward movement of the piston rods 21 and 21', a metered amount of the plasticized record material inside the lower portion of the injection cylinder 11 is injected between the molds 7 and 8 as shown in FIG. 5(a). After the piston rods 21 and 21' have completed their downward movement and the plasticized record material has been injected as shown in FIG. 5(a), the cylinder 6 shown in FIG. 1 is supplied with a hydraulic medium, for instance oil, necessary to generate a clamping force by which the ram 5 is upwardly shifted to clamp the molds 7 and 8 together with the plasticized record material held therebetween.

After a predetermined time during which the compressed record material between the molds 7 and 8 is cooled and then hardened, the ram 5 is downwardly shifted to cause the mold 7 to separate from the mold 8. At this time, the compressed record material, i.e., the information carrier disc, is retained by any known holding means in either of the molds 7 or 8 or in a space between the molds 7 and 8 and is subsequently removed from the clearance between the molds 7 and 8 by means of any suitable removal device.

The screw 20 which had completed the injection of the record material when held at the position shown in FIG. 5 is rotated by the screw drive means 25 and the piston rods 21 and 21' are upwardly shifted gradually by the effect of the hydraulic pressure. During this time, in readiness for the next succeeding cycle of injection and molding, the supply of the material from a hopper 14 shown in FIG. 2 and the metering and storage of the plasticized record material in the lower end of the injection cylinder 11 take place.

During the servicing including the replacement of the feed screw and the cleaning of the interior of the cylinders, a hydraulic medium is supplied to the elevating fluid passages 16 and 16' to cause the cylinders 12 and 12' to rise together with the injection cylinder 11 until the tip of the nozzle 26 is spaced upwardly away from the opening 27 in the upper fixed plate 2. Subsequently, by releasing the lock mechanism (not shown) connected between the holder assemblies 13 and 13' and the drive cylinders 12 and 12', the injection cylinder 11 is tilted as shown in FIG. 6. It is to be noted that, in the condition shown in FIG. 6, the cylinders 12 and 12' have been downwardly shifted while the injection cylinder 11 is tilted, so that the servicing can readily be performed at a height convenient for the attendant worker to reach the screw and/or the interior of the cylinder 11.

FIG. 7 illustrates the condition in which, for the purpose of the removal of the unnecessary plasticized record material 34 from the injection cylinder 11, the drive cylinders 12 and 12' are operated to upwardly shift the injection cylinder 11 until the nozzle 26 is held in position above the manhole 32 and the removal tray 33 is subsequently inserted into the manhole 32 to a position immediately below the nozzle 26. Since the functions of the shielding sleeves 30 and 31 and the method for the removal of the unnecessary plasticized record material 34 have been described previously, they will not be reiterated here for the sake of brevity.

As shown in FIG. 7, the lower end of the spindle 40 of the biasing force adjusting mechanism 38 is separated from the compression spring 37. However, as the drive cylinders 12 and 12' descend with the nozzle 26 approaching the nozzle socket 28, the lower end of the spindle 40 contacts the compression spring 37 to compress the compression spring 37 until the condition shown in FIG. 3 is established, thereby reducing the contact pressure between the nozzle 26 and the nozzle socket 28.

As hereinbefore fully described, the present invention provides an upright injection-compression pressing machine comprising the mold clamper assembly wherein the lower mold 7 carried by the movable plate 4 moves in the vertical direction towards and away from the upper mold 8 carried by the upper fixed plate 2, and the upright injector assembly including the injection cylinder movable at right angles to the upper fixed plate 2, the machine being so designed that the plasticized record material can be injected between the lower and upper molds 7 and 8 from a central portion of the mold 8 to form the information carrier disc between the lower and upper molds 7 and 8. Because of the construction described above, irrespective of the size of the clearance between the lower and upper molds 7 and 8, the record material can uniformly be distributed towards the periphery of the molds 7 and 8 from the central portion. In addition, even when the clamping of the molds 7 and 8 is carried out after the elapse of a period of time during which the molds are heated subsequent to the injection of the record material, there is no possibility that the injected record material will flow by its own weight in one direction such as occurs in the prior art machine. In view of this, the molding conditions including the size of the clearance between the molds during the injection of the record material, the timing with which the molds are clamped together, and/or heating and cooling conditions can be selected as desired and an information carrier disc of high quality can, therefore, be manufactured under optimum conditions appropriate to the selected record material.

Moreover, since the required floor space for the installation of the injection-compression pressing machine according to the present invention corresponds to the bottom surface area of the mold clamper assembly and since the movable component parts of both of the injector and clamper assemblies provide a vertically downwardly acting weight, no substantial bending force acts on the tie bars and the guide structure and, therefore, the individual component parts can be compact in size so that the overall weight and size of the machine as a whole can be reduced and reduced floor space is needed for the installation thereof.

Since the second and third drive means for reciprocately driving the injection cylinder and the feed screw are arranged in parallel relation to each other, the height of the machine as a whole can advantageously be reduced.

In particular, the upright injection-compression pressing machine according to the present invention is advantageous in that it can be installed in a limited floor space such as within a dust free room designed for the production of information carrier discs of high quality.

The prior art injection-compression pressing machine having a horizontal clamper assembly and an upright injector assembly requires respective platforms for the support thereof to give the attendant worker access thereto. Where a centralized hydraulic pressure generator system is employed to operate a plurality of such prior art injection molding machines, the space referred to above is wasted space. However, the present invention is free from these disadvantages and the machine of the present invention can advantageously be installed in a limited available floor space and is, therefore, suited for use in a mass production line.

Yet, since the centering of the upper and lower molds 8 and 7 is carried out by the utilization of the guide pins without relying on the guide preciseness of the tie bars and the lower mold 7 is made movable in the vertical direction together with the movable plate 4, the upright injection-compression pressing machine according to the present invention has an advantage that cannot be found in the prior art machine, i.e., the capability of precise centering of the molds.

By the provision of the shielding sleeves 30 and 31 and the manhole 32 in association with the removal tray 33, any possible intrusion of foreign matter and/or dirty oil between the stampers 29 and 29' through the opening in the nozzle socket 28, which is considered one of the disadvantages inherent in the prior art machine of a similar kind, can advantageously be avoided, thereby enabling the molding of information carrier discs of high quality and also permitting the stampers 29 and 29' to be utilized repeatedly for a long period of time for the production of a number of information carrier discs.

Yet, by the provision of the biasing force adjusting mechanism between the upper fixed plate 2 and the movable mechanism around the cylinders, no excessive weight is imposed on the nozzle and both the nozzle socket and the molds, thereby reducing the possibility of a fixing mechanism between the nozzle socket and the molds being damaged and also minimizing the deformation of the molds. Where the nozzle socket is so designed as to serve as a means for securing the respective stamper to the associated mold, the force necessary to fix the stamper to the associated mold can be stabilized. Furthermore, even though the molding conditions and/or the type of the record material vary, the contact pressure acting on the nozzle can simply be adjusted as desired.

Although the present invention has fully been described in connection with the preferred embodiments thereof with reference to the accompanying drawings, it is to be noted that various changes and modifications will be apparent to those skilled in the art. Such changes and modifications are to be understood as being included within the true scope of the present invention unless they depart therefrom.

What is claimed is:

1. An upright injection-compression pressing machine for the manufacture of an information carrier disc, which comprises, in combination:
   upper and lower fixed plates positioned one above the other and tie bars connecting said fixed plates to each other in face-to-face and spaced relation;
   an upper mold carried by said upper fixed plate, said upper fixed plate having a nozzle receiving aperture extending therethrough and opening through said upper mold;
   a movable plate in face-to-face relation to said upper mold, said movable plate being movably mounted on said tie bars for movement between said upper and lower fixed plates along said tie bars serving as guides therefor;
   a lower mold carried by said movable plate;
   a first drive means mounted on said lower fixed plate and operatively coupled to said movable plate for moving said movable plate to a first position wherein said movable plate is spaced from said upper fixed plate a distance sufficient to permit an information carrier disc to be removed from between said upper and lower molds, a second position where said upper and lower molds are spaced a small distance from each other, and a third position wherein said upper and lower molds are clamped together, respectively;

guide members mounted on said upper fixed plate and extending in a vertical direction;

a holder assembly slidably mounted on said guide members and pivotally mounted for pivoting movement laterally of said guide members;

a second drive means connected between said guide members and said holder assembly for reciprocatingly driving said holder assembly along said guide members;

an injection cylinder having the upper end inserted in and rigidly secured to said holder assembly and extending in a vertical direction therefrom and having a nozzle portion at the lower end for extending through said aperture in said upper fixed plate to supply a material to the space between said molds from the center of said upper mold, said injection cylinder having a feed screw therein;

a screw drive means operatively coupled to the upper end of said feed screw;

a third drive means on said holder assembly and operable to reciprocatingly drive said feed screw in said injection cylinder; and first and second shielding sleeves secured respectively to a lower end of the injection cylinder and the upper fixed plate around said aperture, said first and second shielding sleeves being positioned one over the other so as to be substantially telescopically extendable for shielding said aperture in the upper fixed plate from the outside.

2. A machine as claimed in claim 1, wherein each of said second and third drive means is constituted by a separate hydraulic drive mechanism, the hydraulic drive mechanisms of said second and third drive means being in parallel relation to each other substantially at the same height.

3. A machine as claimed in claim 1, wherein said second drive means comprises drive cylinders slidably provided on the guide members, piston members rigidly secured to the guide members so as to divide the interiors of the drive cylinders into two portions, means for selectively supplying a hydraulic pressure into the interiors of the respective cylinders so divided by the piston members, and the injection cylinder holder assembly connecting the drive cylinders together.

4. A machine as claimed in claim 1, further comprising biasing force adjusting mechanism positioned between a portion of a mechanism movable together with the injection cylinder and the upper fixed plate for adjusting the contact pressure between the nozzle of the injection cylinder and a nozzle socket in the upper mold.

5. A machine as claimed in claim 1 wherein said third drive means comprises a pair of piston rods and hydraulic cylinders on said holder assembly extending in the vertical direction, said piston rods being connected to said screw drive means.

6. A machine as claimed in claim 1 wherein said aperture in said upper fixed plate is communicated with a nozzle socket at the central region of said upper mold, said first shielding sleeve being mounted on said upper fixed plate coaxially of said aperture and protruding therefrom and surrounding said aperture; and said second shielding sleeve having one end secured to said injection cylinder at a position adjacent said nozzle portion and having a diameter gradually increasing toward the other end thereof, whereby, when said holder assembly is lowered by said second drive means, said nozzle portion of said injection cylinder abuts the nozzle socket and the other end of said second shielding sleeve substantially closes the opening in said first shielding sleeve.

7. A machine as claimed in claim 1 wherein said upper fixed plate has a manhole therein in communication with said aperture at a position intermediate the thickness of said upper fixed plate and extending in a direction perpendicular to said injection cylinder, and further comprising a tray adapted to be removably inserted into said manhole for receiving excess plasticized material from the injection cylinder when such material is to be removed from said injection cylinder.

* * * * *